United States Patent [19]

Chamzas et al.

[11] Patent Number: 4,870,497

[45] Date of Patent: Sep. 26, 1989

[54] PROGRESSIVE TRANSMISSION OF HIGH RESOLUTION TWO-TONE FACSIMILE IMAGES

[75] Inventors: Christodoulos Chamzas, West Long Branch; Donald L. Duttweiler, Rumson, both of N.J.

[73] Assignees: American Telephone and Telegraph Company, New York, N.Y.; AT&T Bell Laboratories, Murray Hill, N.J.

[21] Appl. No.: 146,998

[22] Filed: Jan. 22, 1988

[51] Int. Cl.$^4$ .......................... H04N 1/415; H04N 1/40
[52] U.S. Cl. ..................................... 358/426; 358/133; 358/447
[58] Field of Search ...................... 358/133, 260, 261.1, 358/261.2, 261.3, 261.4, 280, 282, 284

[56] References Cited

U.S. PATENT DOCUMENTS

| | | | |
|---|---|---|---|
| 4,222,076 | 9/1980 | Knowlton | 358/263 |
| 4,261,018 | 4/1981 | Knowlton | 358/263 |
| 4,280,144 | 7/1981 | Bacon | 358/280 |
| 4,356,355 | 10/1982 | Ejiri et al. | 358/284 |
| 4,360,883 | 11/1982 | Ejiri et al. | 358/284 |
| 4,365,273 | 12/1982 | Yamada et al. | 358/133 |
| 4,366,506 | 12/1982 | Ejiri et al. | 358/133 |
| 4,414,580 | 11/1983 | Johnsen et al. | 358/260 |
| 4,656,664 | 4/1987 | Anderson et al. | 382/47 |
| 4,670,792 | 6/1987 | Dureighe et al. | 358/280 |
| 4,751,585 | 6/1988 | Shibazaki | 358/280 |

FOREIGN PATENT DOCUMENTS

| | | | |
|---|---|---|---|
| 55-124363 | 9/1980 | Japan | 358/260 |
| 59-86980 | 5/1984 | Japan | 358/280 |
| 2184317 | 6/1987 | United Kingdom . | |

OTHER PUBLICATIONS

"Line-Preserving Binary Image Reduction Algorithm", ISO/TC97/SC2/WG8, N 601 Rev O, dated Oct. 29, 1987.

G. G. Langdon, Jr. et al., "Compression of Black-White Images with Arithmetic Coding", *IEEE Transactions on Communications*, vol. COM-29, No. 6, Jun. 1981, pp. 858-867.

"Facsimile Coding Schemes and Coding Control Functions for Group 4 Facsimile Apparatus", *International Telephone and Telegraph Consultative Committe (CCITT)*, Redbook, Fasicle VII.3, Rec. T.6, 1984, pp. 40-48.

T. Endoh et al., "Progressive Coding Scheme for Interactive Image Communications", *IEEE Communication Society Global Telecommunications Conference*, Nov. 26-29, 1984, pp. 1426-1433.

"Progressive Coding Scheme (PCS)", ISO/TC97/SC2/WG8, dated Jun. 1987.

Primary Examiner—Edward L. Coles, Sr.
Assistant Examiner—Randall S. Svihla
Attorney, Agent, or Firm—Thomas Stafford

[57] ABSTRACT

A high resolution image is decomposed to a basic lower resolution replica and a plurality of supplemental information fields for use in a progressive high resolution image facsimile transmission system. The basic lower resolution replica is generated by successive decompositions of the original image into a plurality of intermediate lower resolution replicas and corresponding supplemental information fields by employing a so-called edge decomposition technique. The supplemental information fields are required in a receiver to upgrade the basic lower resolution replica toward the original high resolution replica.

22 Claims, 11 Drawing Sheets

PROGRESSIVE TRANSMISSION OF HIGH RESOLUTION TWO-TONE FACSIMILE IMAGES

CROSS-REFERENCE TO RELATED APPLICATIONS

U.S. patent application Ser. No. 146,917 was filed concurrently herewith.

TECHNICAL FIELD

This invention relates to the digital transmission of information and, more particularly, to the progressive digital transmission of two-tone (black and white) images through facsimile.

BACKGROUND OF THE INVENTION

In a rapidly shrinking business world, use of facsimile transmission of documents and the like is increasing at a rapid rate worldwide. The introduction of digital networks and the use of high resolution monitors for soft copy and browsing have added additional requirements to the facsimile world. For some applications, rapid output to a high resolution image is frequently desirable and sometimes necessary. To this end, a number of arrangements have been proposed for enhancing received two-tone images in order to increase their resolution through use of progressive coding. In one particular facsimile progressive coding scheme, the image information to be transmitted is separated into so-called lower resolution information and supplemental information. In this prior facsimile scheme, the lower resolution information is based on a subsampling technique of the original image and the supplemental information is transmitted by employing a predictive encoding scheme based on the adjacent transmitted pixels (picture elements) of the image. One such prior progressive coding scheme is described in an article entitled "Progressive Coding Scheme for Interactive Image Communications", by T. Endoh and Y. Yamazaki, in IEEE Communications Society, Global Communications Conference, Nov. 26–29. 1984, pages 1426 through 1433.

A disadvantage of this prior facsimile progressive coding scheme is that excessive information is required to be transmitted when an image includes no information, for example, when an image has large areas of a single tone(i.e., either white or black). Also, if the subsampling interval is large, then thin lines can disappear completely. Other facsimile image coding schemes avoid this problem, e.g., see U.S. Pat. No. 4,261,018 issued to K. C. Knowlton on Apr. 7, 1981, by using some form of pyramidal data structure. However, such prior schemes require storing of the entire image to be transmitted and, consequently, require large memory. Additionally, such prior schemes are incompatible with the line-by-line coders which have been proposed as the standard for conventional digital facsimile transmission.

SUMMARY OF THE INVENTION

The problems associated with prior two-tone progressive high resolution image facsimile transmission arrangements are overcome, in accordance with an aspect of the invention, by efficiently decomposing the original image into a so-called basic lower resolution replica and into a plurality of supplementary information fields. The basic lower resolution replica is generated by successive decompositions of the original high resolution image into a number of intermediate lower resolution replicas and supplemental information fields. The supplemental information fields are required to upgrade the basic lower resolution replica back into the original high resolution image by successive resolution refinements.

Each of the lower resolution replicas is generated in such a way that its supplemental information, if any, for a lower resolution pixel is at prescribed locations defined as so-called "edges". Specifically, a pixel in a lower resolution replica is determined to be located at an "edge" if either an adjacent lower resolution replica pixel before it on the same line or an adjacent lower resolution replica pixel above it in a previous line is of a different tone. If it is determined that supplemental information is required for the lower resolution pixel not at an edge, its tone is selected so that it is forced to be at an edge. In this example, this is effected if the adjacent low resolution pixels have the same tone as the lower resolution pixel and any one or more of the higher resolution pixels in the corresponding super pixel has a tone different from the adjacent low resolution pixels. Supplemental information for a lower resolution replica pixel is generated and transmitted only if it is at an "edge".

A first lower resolution replica is created by employing a decomposition process in which a so-called super pixel in the original high resolution image, which includes a plurality of high resolution pixels, is replaced with a single lower resolution replica pixel and corresponding supplemental information, if any is required. The information required to convert the single lower resolution replica pixel back to the super pixel of the original high resolution image is the supplemental information. Note that this supplemental information is required only for the lower resolution replica pixels located at "edges". The tone of the lower resolution pixel at an edge is determined in accordance with prescribed criteria dependent on the relationship of the tones of predetermined other lower resolution pixels adjacent to it and on the tones of the higher resolution pixels in its corresponding super pixel. This process is iterated for each of the number of intermediate lower resolution replicas until the basic lower resolution replica is obtained.

In a receiver, the decomposition is reversed and the basic lower resolution replica is progressively upgraded until the original high resolution image is recomposed. This recomposition is acheived by substituting the transmitted supplemental information, if any, for the corresponding intermediate lower resolution pixels located at the edges of the basic and following lower resolution replicas.

DETAILED DESCRIPTION

Figure 1:
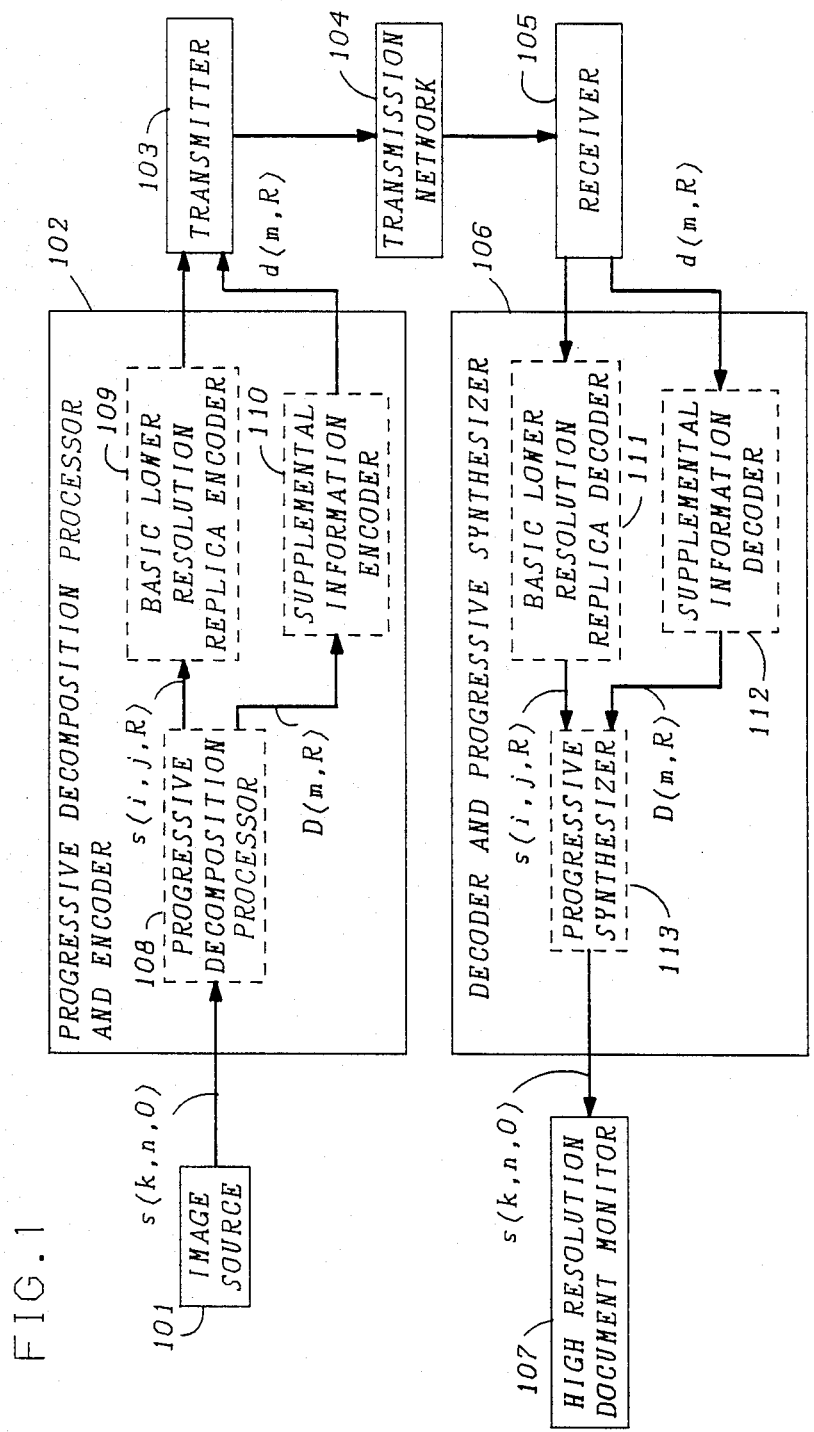
FIG. 1 shows in simplified block diagram form a progressive facsimile transmission system incorporating the invention.

FIG. 1 shows, in simplified block diagram form, a progressive facsimile transmission system including an embodiment of the invention. Accordingly, shown are image source 101, progressive decomposition processor and encoder 102, transmitter 103, transmission network 104, receiver 105, decoder and progressive synthesizer 106 and high resolution document monitor 107.

Figure 2:
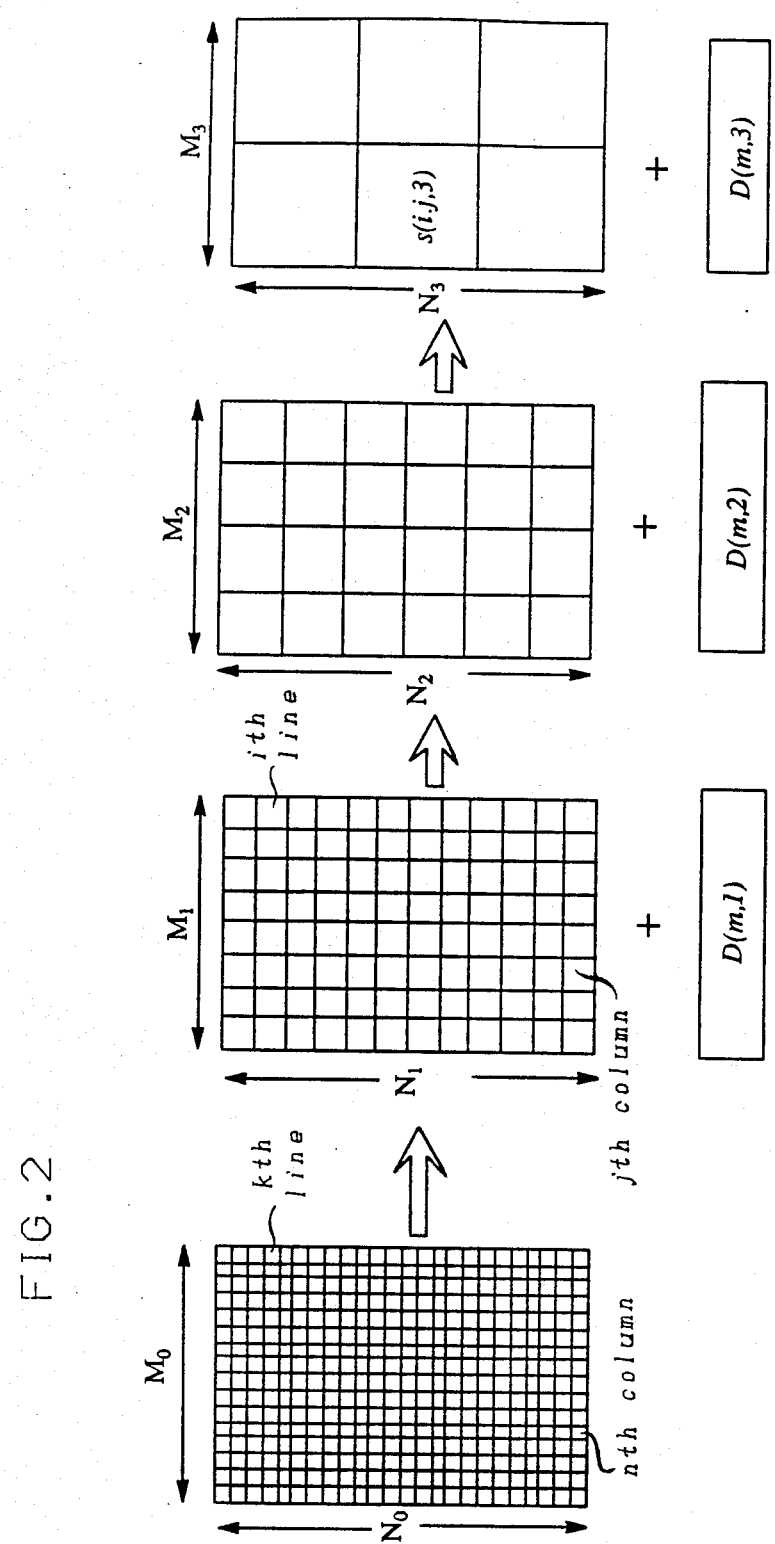
FIG. 2 depicts in graphic form a high resolution image, a number of intermediate lower resolution replicas, plus the required supplemental information, useful in describing the invention.
Figure 3:
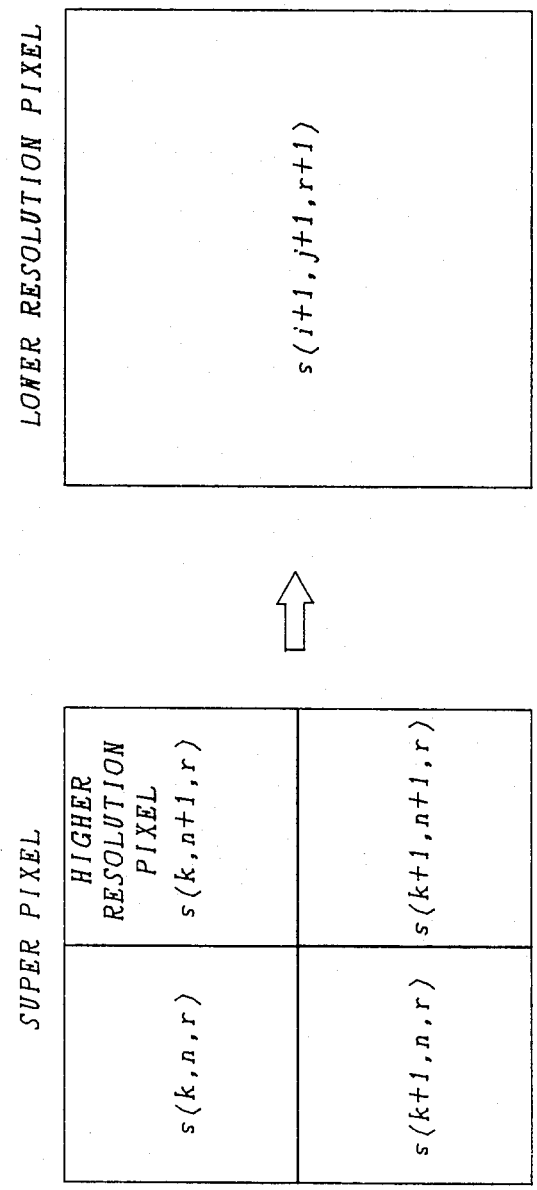
FIG. 3 shows in graphic form a so-called super pixel and a corresponding lower resolution pixel.

Image source 101 provides, in this example, a desired high resolution image and may be, for example, either a scanner or a data base. One such scanner which may advantageously be employed is manufactured by Canon and is designated laser copier scanner NP-9030. The images to be transmitted may also be stored in a data base on, for example, either a magnetic disc or an optical disc, e.g., Optimum 1000. In this example, not to be construed as limiting the scope of the invention, the high resolution image includes 400dots per inch and has $M_0$ columns (pixels/line) and $N_0$ lines and includes $M_0 \times N_0$ pixels, as shown in FIG. 2. A so-called super pixel is shown in FIG. 3 and includes a block of "$a_r \times b_r$" "high" resolution pixels. Where "r" indicates the order of the particular replica and has values of 0, 1, 2, ..., R. Thus, r=O represents the original high resolution image and r=R represents the so-called basic lower resolution replica. Although any desired number of high resolution pixels from a plurality of columns and lines may be grouped to form a super pixel, in this example, it has been convenient to group four (4) adjacent high resolution pixels into a super pixel. Thus, a super pixel includes a block ($a_r=b_r=2$) of four high resolution pixels, namely, s(k,n,r), s(k+1,n,r), s(k,n+1,r) and s(k+1,n+1,r) (k and n are the column and row indexes for the original high resolution image). If $M_0$ and $N_0$ are not integer multiples of $a_1$ and $b_1$, respectively, then a number of imaginary columns and/or lines are appended so that the above condition is satisfied. In this example, when the Canon scanner is employed to scan the original image, at 400 dots per inch, it yields $M_0=3456$ columns and $N_0=4672$ lines for an A4 standard size document.

Progressive decomposition processor and encoder 102 of FIG. 1 includes the functions shown in dashed outline, namely, progressive decomposition processor 108, basic lower resolution replica encoder 109 and supplemental information encoder 110. Progressive decomposition processor 108 decomposes the high resolution image from image source 101, in accordance with an aspect of the invention, into a basic lower resolution replica and a number of supplemental information fields. Specifically, progressive decomposition processor 108 supplies the basic lower resolution pixels s(i,j,R) to basic lower resolution replica encoder 109 and the number of supplemental information fields D(m,R) to supplemental information encoder 110 (i and j are the column and row indices for the lower resolution replicas). Progressive decomposition processor 108 first creates the basic lower resolution replica of the original image through successive decompositions of the original image into a number of intermediate lower resolution replicas and corresponding supplemental information fields.

This successive decomposition process is graphically illustrated in simplified form in FIG. 2. Thus, the high resolution image having $M_0$ columns and $N_0$ lines is first decomposed into a so-called intermediate lower resolution replica r=1 having $M_1$ columns and $N_1$ lines plus a supplemental information field D(m,1). In this example, $M_1=M_0/a_1=M_0/2$ and the resolution of intermediate lower resolution replica r=1 is 200 dots/inch. Although not shown, it is assumed that each of the intermediate lower resolution replicas has an imaginary reference column of pixels to the left of the first column and an imaginary reference line of pixels above the first line. In this example, these imaginary reference lines are chosen to be white. This decomposition is realized by replacing every super pixel of the original high resolution image with one lower resolution pixel in the intermediate lower rsolution replica. The relationship between a super pixel and a lower resolution pixel is shown in FIG. 3. Again, the super pixel includes higher resolution pixels s(k,n,r), s(k+1,n,r), s(k,n,+1,r) and s(k+1,n+1,r) and the single lower resolution pixel is s(i+1,j+1,r+1) where j=(n−1)/$a_r$ and i=(k−1)/$b_r$. The difference between the original high resolution image or replica and the lower resolution replica is the supplemental information required to upgrade the lower resolution replica into a higher resolution image or replica. It should be noted that the supplemental information for the lower resolution pixel is generated only when the pixel is at an "edge" in the lower resolution replica. Generation of the supplemental information for the lower resolution pixels at edges in the respective lower resolution replicas is described hereinafter with respect to the decomposition process.

The decomposition process is repeated for the next intermediate lower resolution replica r=2 having $M_2$ columns and $N_2$ lines plus a supplemental information field D(m,2). In this example, $M_2=M_0/a_2=M_0/4$, $N_2=N_0/b_2=N_0/4$ and the resolution of intermediate lower resolution replica r=2 is 100 dots/inch. Thus, intermediate lower resolution replica r=1 becomes the higher resolution image which is decomposed into intermediate lower resolution replica r=2 plus supplemental information field D(m,2). This process is iterated (r=1, 2, ..., R) until the final intermediate lower resolution replica is reached (r=R). This final replica has been defined as the basic lower resolution replica. Thus, the basic lower resolution replica, in this example (r=R), is generated plus its supplemental information field D(m,3). In this example, $M_3=M_0/a_3=M_0/8$, $N_3=N_0/b_3=N_0/8$ and the resolution of basic lower resolution replica r=3 is 50 dots/inch. Although the progressive decomposition process generates three intermediate lower resolution replicas and the corresponding number of supplemental information fields, in this example, it will be apparent that any number of successive decompositions can be made. Indeed, if desired, the decomposition process can be continued until only supplemental information is generated.

Figure 4:
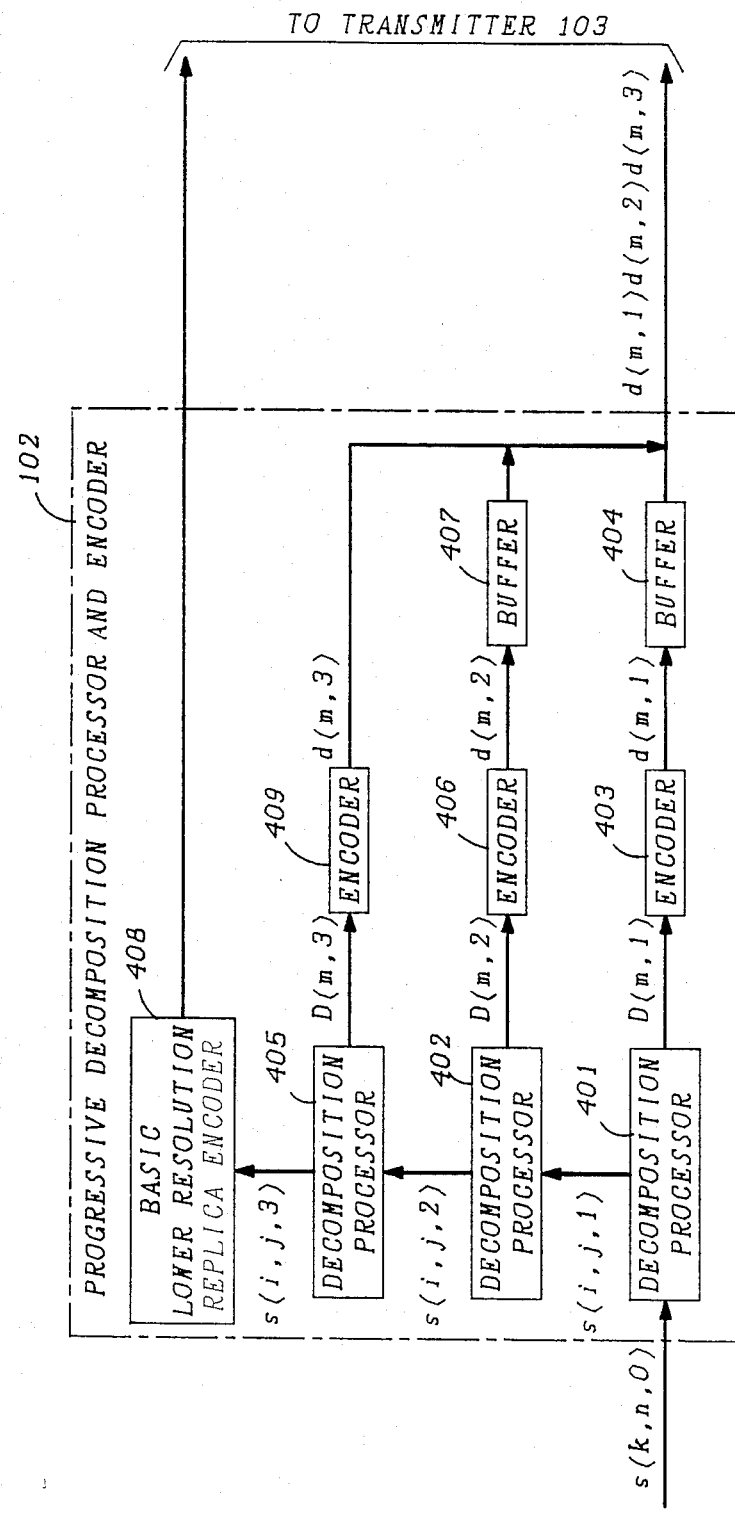
FIG. 4 depicts in simplified block form details of one implementation of progressive decomposition processor and encoder 102 of FIG. 1.

FIG. 4 shows in simplified block diagram form details of one implementation of progressive decomposition processor and encoder 102 of FIG. 1. Although any desired number of intermediate decompositions may be employed as desired, for simplicity and clarity of description, in this example, three (3) (R=3) successive decompositions are assumed. Accordingly, shown is decomposition processor 401 to which pixels s(k,n,0) from a high resolution image are supplied from image source 101 (FIG. 1). Decomposition processor 401 decomposes the original high resolution image into a first intermediate lower resolution replica (r=1) plus supplemental information (D(m,1)). The decomposition process of decomposition processor 401 is described hereinafter in relationship to the flow chart of FIG. 5. Thus, decomposition processor 401 generates pixels s(i,j,1) which are supplied to decomposition processor 402 and supplemental information D(m,1) which is supplied to supplemental information encoder 403. Supplemental information encoder 403 is employed to encode the supplemental information D(m,1), if any, corresponding to the current lower resolution pixels(i,j,1) being generated by decomposition processor 401. In this example, encoder 403 uses a so-called arithmetic encoding scheme. One such encoder arrangement is disclosed in an article entitled "Compression of Black-White Images with Arithmetic Coding", *IEEE Transactions on Communications*, Vol. COM-29, No. 6, June 1981, pp. 858–867. The encoded supplemental information d(m,1) is supplied to buffer storage unit 404 where it is stored to be supplied to transmitter 103 (FIG. 1) in proper sequential order. Depending upon the particular application, any other encoding schemes can also be used in the encoder.

Decomposition processor 402 is identical to decomposition processor 401 and operates to decompose the first intermediate replica (r=1) into a second intermediate replica (r=2) plus supplemental information (D(m,2)). Accordingly, decomposition processor 402 generates pixels s(i,j,2) which are supplied to decomposition processor 405 and supplemental information D(m,2) which is supplied to supplemental information encoder 406. Encoder 406 is identical to supplemental encoder 403 and supplies encoded supplemental information d(m,2) to buffer storage unit 407 where it is stored to be supplied to transmitter 103 (FIG. 1) in proper sequential order.

The last decomposition processor 405 is identical to decomposition processor 401 and operates to decompose the second intermediate lower resolution replica (r=2) into a third lower resolution replica (r=3) plus supplemental information (D(m,3)). In this example, only three successive decompositions are employed and the third intermediate replica is defined as the so-called basic lower resolution replica. Basic implies that the lower resolution replica is the beginning point for upgrading an image at a remote location toward the original high resolution image. Accordingly, decomposition processor 405 generates pixels s(i,j,3) which are supplied to basic lower resolution encoder 408 and supplemental information D(m,3) which is supplied to supplemental information encoder 409.

Basic lower resolution replica encoder 408 is employed to encode the basic lower resolution pixels s(i,j,3), in well-known fashion. Specifically, any one of several known CCITT or other standard encoding techniques may be employed. Preferably, the encoding technique utilized is the one described in INTERNATIONAL TELEPHONE AND TELEGRAPH CONSULTATIVE COMMITTEE (CCITT), "Facsimile Coding Schemes and Coding Control Functions for Group IV Facsimile Apparatus", Redbook, Fasicle VII.3, Rec. T.6, 1984, pp. 40–48. The purpose of using the preferred encoding scheme for the lower resolution replica essential information is to maintain compatability with existing facsimile transmission equipment. The encoded pixel information is supplied from encoder 408 to transmitter 103. Supplemental information encoder 409 is also identical to supplemental information encoder 403 and supplies encoded supplemental information d(m,3) to transmitter 103 in proper sequential order.

Since the image is intended to be upgraded at a remote location from the basic lower resolution replica, in this example, the first encoded supplemental information that is required at the remote location is d(m,3), the next required encoded supplemental information is d(m,2) and, finally, d(m,1). Consequently, the encoded supplemental information is supplied to transmitter 103 in the reverse order in which it was generated, namely, d(m,3), d(m,2) and d(m,1). This is readily achieved by a simple multiplexing arrangement (not shown).

The operation of each of decomposition processors 401, 402, and 405 is identical. Consequently, the operation of decomposition processors 401, 402 and 405 will be described in generalized form with reference to decomposition processor 401. Operation of the decomposition process used in decomposition processor 401 in decomposing the higher resolution image into the desired intermediate lower resolution replica is shown in the flow chart of FIG. 5. Accordingly, the decomposition process is entered via start step 501. Thereafter, operational block 502 causes the index r and the number of columns $M_R$ and lines $N_r$ to be obtained either from image source 101 for r=0 or from a previous decomposition processor for r>0. Then, operational block 503 causes the initialization of decomposition processor 401 by setting i=m=0, k=n=1, s(0,j,r+1)="0" for $0 \leq j \leq M_r/2$, and s(1,0,r=1)="O", where "0" represents a white tone and is a logical 0. Conversely, "1" represents a black tone and is a logical 1. Operational block 504 obtains from image source 101 the nth and (n+1)th pixels from the kth and (k+1)th lines of the original high resolution image, namely, s(k,n,r), s(k,n+1,r), s(k+1,n,r) and s(k+1,n+1,r). This represents a super pixel ($a_r=b_r=2$) in the higher resolution image which is to be decomposed into a single lower resolution pixel in a lower resolution replica plus any supplemental information that is required. Operational block 505 sets index j in the lower resolution replica to j=(n−1)/2. Conditional branch point 506 tests to determine whether the current lower resolution pixel is located on an "edge" in the lower resolution replica. The current lower resolution pixel is defined as s(i+1,j+1,r+1). The test of step 506 is effected by comparing the previous lower resolution pixel s(i+1,j,r+1) on the same line as the current lower resolution pixel to the pixel above the current lower resolution pixel on the previous line, namely, s(i,j+1,r+1). Thus, if s(i+1,j,r+1)=s(i,j+1,r+1) the test result is NO and control is transferred to conditional branch point 507 where further testing is done to determine whether or not the current lower resolution pixel is at an edge and supplemental information must be generated for the current pixel. If the test result in step 506 is YES, $s(i+1,j,r+1) \neq s(i,j+1,r+1)$ and the current lower resolution pixel is at an edge. Consequently, supplemental information needs to be generated for the current lower resolution pixel. Accordingly, operational block 508 generates supplemental information $D(m,r+1)$ for the current lower resolution pixel. Since in this example, the super pixel includes four two-tone high resolution pixels, there are sixteen possible combinations. Supplemental information $D(m,r+1)$ determines which one of the sixteen possible combinations is the current super pixel. Thus, step 508 generates $D(m,r+1)=s(k,n,r+1)$, $s(k,n+1,r+1)$, $s(k+1,n,r+1)$ and $s(k+1,n+1,r+1)$, which yields a binary number depending on the tones included in the plurality of high resolution pixels of the current super pixel. By way of an example, if $s(k,n,r+1)$ is white, $s(k,n+1,r+1)$ is black, $s(k+1,n,r+1)$ is white and $s(k+1,n+1,r+1)$ is black and, since white is a logical 0 and black is a logical 1, $D(m,r+1)=0101$ (binary). Operational block 509 increments the supplemental information counter, $m=m+1$. Operational block 510 chooses the tone of the current lower resolution pixel, $s(i+1,j+1,r+1)$. A particular subprocess (SUB A) for selecting the tone of the current lower resolution pixel is shown in FIG. 6 and is described later. Let us now return to step 507. Step 507 effectively determines if the tone of the previous lower resolution pixel on the same line as the current lower resolution pixel is the same as all the tones of the high resolution pixels in the current super pixel. If the tones of the high resolution pixels of the current super pixel corresponding to the current lower resolution pixel are all the same as the previous lower resolution pixel on the same line as the current lower resolution pixel, the test result of step 507 is YES and there is no need to generate supplemental information for the current lower resolution pixel. Thereafter, operational block 511 sets the tone of the current lower resolution pixel to be the same as the tone of the previous lower resolution pixel on the same line as the current lower resolution pixel, i.e., $s(i+1,j+1,r+1)=s(i+1,j,r+1)$. If the test result in step 507 is NO, supplemental information is required to be generated for the current lower resolution pixel. Therefore, operational block 512 generates supplemental information $D(m,r+1)$ for the current lower resolution pixel in the same manner as step 598 described above. Thereafter, operational block 513 causes the supplemental information counter to be incremented, $m=m+1$. Operational block 514 causes the tone of the current lower resolution pixel to be opposite the tone of the previous lower resolution pixel on the same line as the current lower resolution pixel and, hence, forces the current lower resolution pixel to be at an edge.

In summary, steps 504 through 514 are employed to decompose a super pixel in a high resolution image including a plurality of high resolution pixels, in this example, 4 high resolution pixels, arranged in a so-called 2-by-2 configuration (FIG. 3), into a single lower resolution pixel in the lower resolution replica plus supplemental information, if any is required.

Operational block 515 increments the column counter for the high resolution image by 2, namely, $n=n+2$, to go on to the next super pixel. Conditional branch point 516 tests to determine if the last column in a line (end of line) has been reached, namely, $n \geq M_r$. If the test result is NO, the last column has not been reached and control is returned to operational block 504 and steps 504 through 515 are iterated for the next super pixel in the high resolution image. If the test result in step 516 is YES, the last column has been reached and operational block 517 increments the line counter by 2, namely, setting $k=k+2$. Conditional branch point 518 tests to determine if the end of image has been reached, namely, if $k \geq N_r$. If the test result is YES, the process is stopped via step 519. If the test result in step 518 is NO, operational block 520 sets the high resolution column counter to $n=1$, and the lower resolution line counter to $i=(k-1)/2$. Thereafter, operational block 521 initializes the pixel in the lower resolution replica to be a white tone, namely, $s(i,0,r+1)=$"0". Thereafter, control is returned to operational block 504 and the process is iterated until the image is completed and step 518 yields a YES result.

Figure 5:
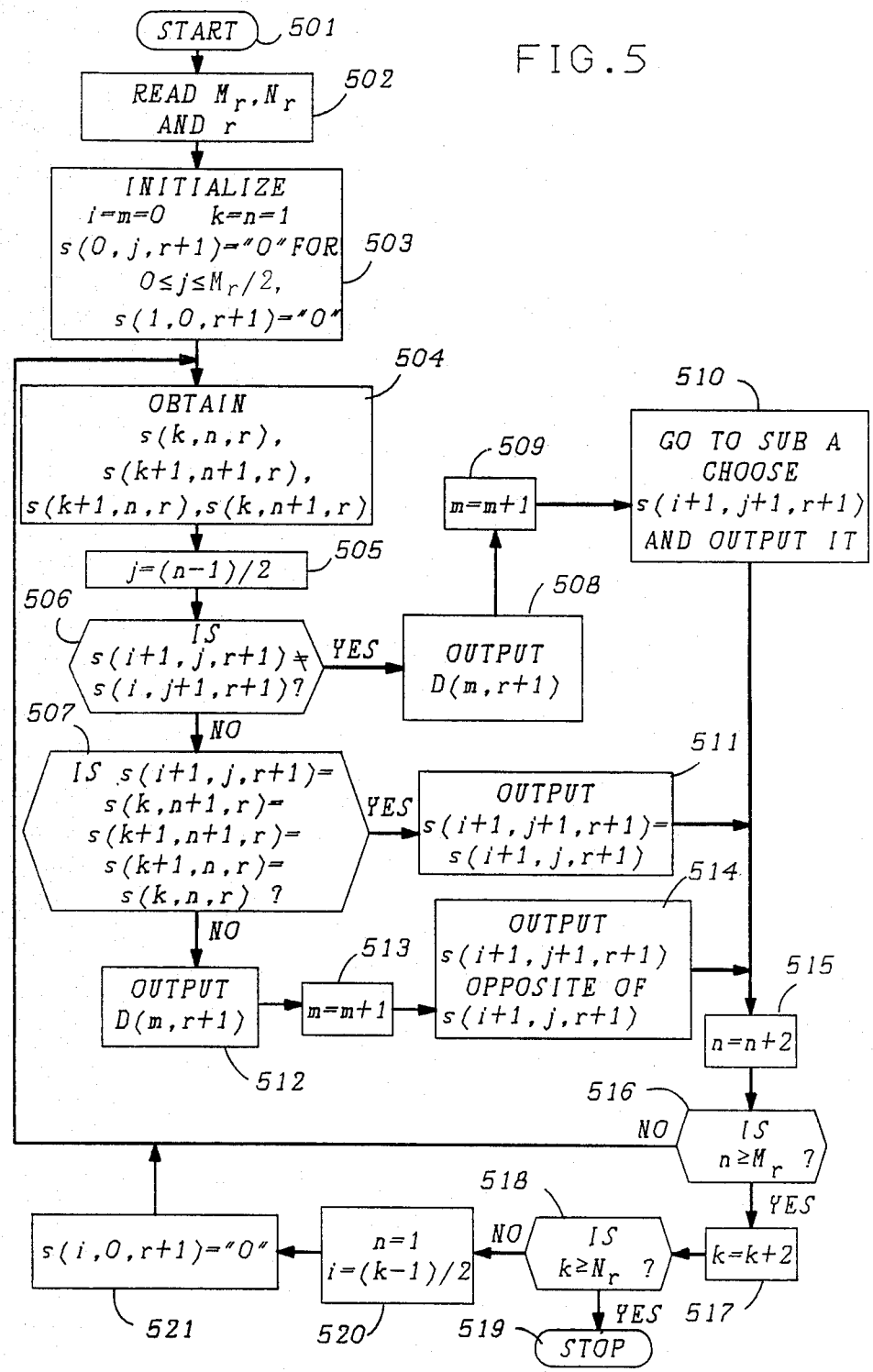
FIG. 5 illustrates a flow chart of a decomposition process employed in the progressive decomposition processor and encoder implementation of FIG. 4.
Figure 6:
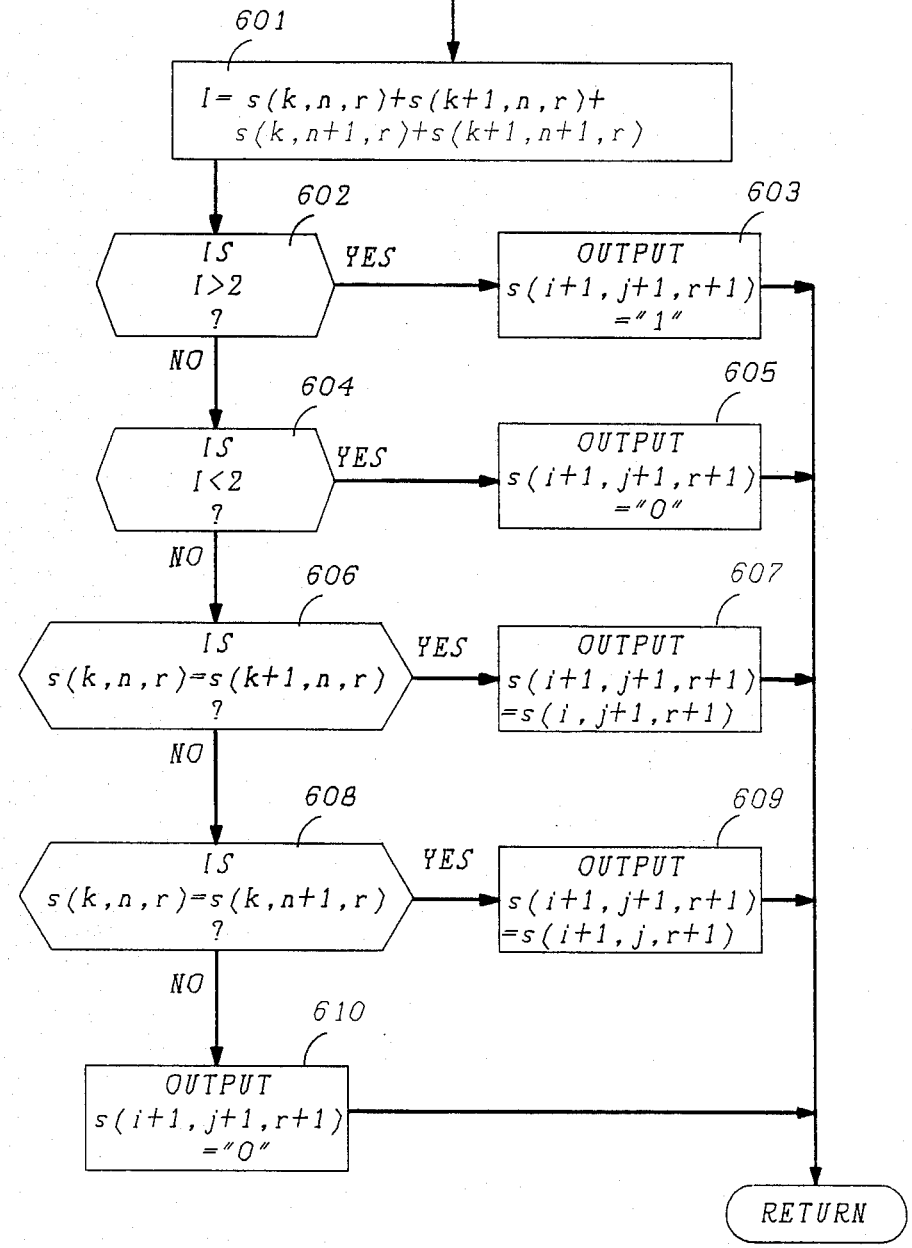
FIG. 6 depicts a flow chart of a subprocess (SUB A) used to select the tone of the supplemental information generated in the flow chart of FIG. 5 and the flow chart of FIGS. 7 and 8.

FIG. 6 is a flow chart describing the operation of subprocess SUB A used in step 510 of FIG. 5 in choosing the tone of the current lower resolution pixel. Accordingly, operational block 601 counts the number of a predetermined tone, in this example, black, that is included in the high resolution pixels of a super pixel. To this end, parameter I is set equal to the number of black pixels present in the current super pixel, i.e., $I=s(k,n,r)+s(k+1,n,r)+s(k,n+1,r)+s(k+1,n+1,r)$. Thereafter, conditional branch point 602 tests to determine whether the number of high resolution pixels with black tone in the current super pixel is greater than half of the high resolution pixels in the super pixel. Since, in this example, the super pixel includes four high resolution pixels, step 602 tests to determine whether $I>2$. If the test result is YES, operational block 603 sets the tone of the current pixel in the lower resolution replica to black and a logical 1 is outputted for $s(i+1,j+1,r+1)$. If the test result in step 602 in NO, conditional branch point 604 tests to determine if the number of high resolution pixels in the current super pixel which are black tone is less than half of the high resolution pixels in the current super pixel. In this example, step 604 tests whether $I<2$. If the test result is YES, operational block 605 causes the current lower resolution pixel to have a white tone and a logical 0 is outputted. If the test result in step 604 is NO $(I=2)$, conditional branch point 606 tests to determine if $s(k,n,r+1)=s(k+1,n,r+1)$, which would indicate that all high resolution pixels in a column of the super pixel have a black tone. If the test result is YES, operational block 607 causes the tone of the current lower resolution pixel to be set to be equal to that of the lower resolution pixel in the previous line above the current lower resolution pixel. If the test result in step 606 is NO, conditional branch point 608 test to determine if all high resolution pixels in the same line of the super pixel have a black tone. If the test result is YES, operational block 609 causes the tone of the current lower resolution pixel to be set to that of the previous lower resolution pixel in the same line as the current lower resolution pixel. If the test result in step 608 is NO, operational block 610 causes the current lower resolution pixel to have a white tone and a logical 0is outputted.

Each of decomposition processors 401, 402 and 405 can be implemented either in software for use in a processor, e.g., a digital signal processor, or on a VLSI chip or the like, as desired. Indeed, it is envisioned that progressive decomposition processor and encoder 102 (FIG. 1) will be implemented on a VLSI chip.

Figure 7:
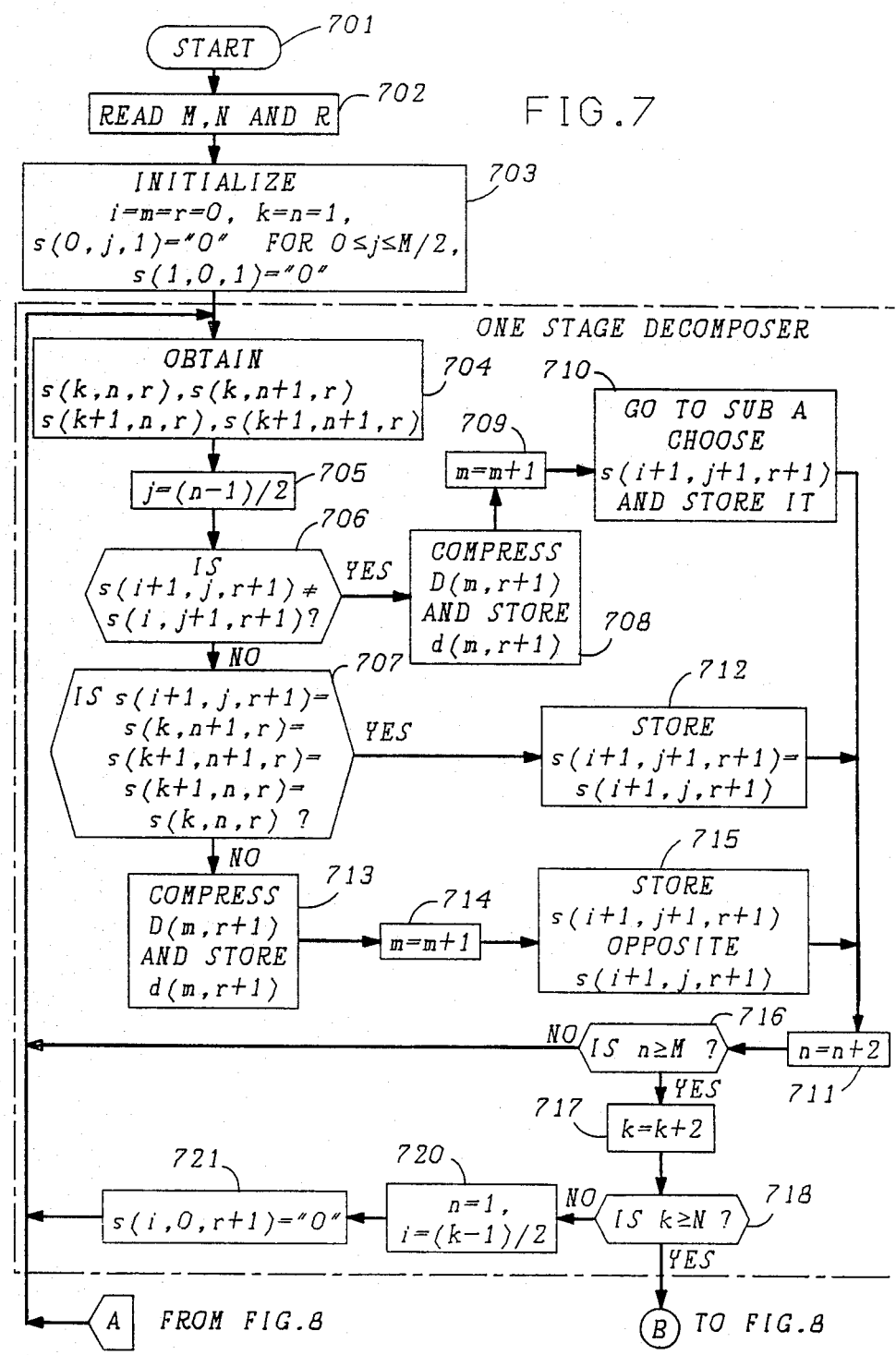
FIG. 7 and FIG. 8 when combined at A—A and B—B show a flow chart of a software implementation of progressive decomposition processor and encoder 102 of FIG. 1.
Figure 8:
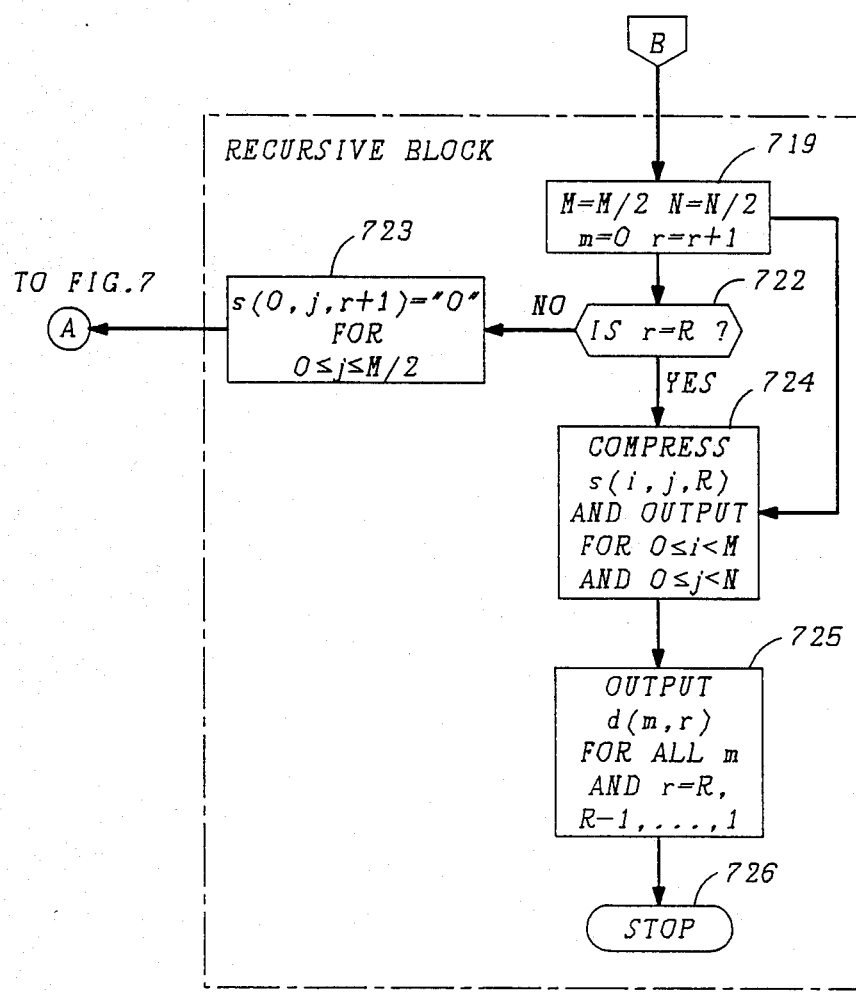

FIGS. 7 and 8 when connected A—A and B—B form a flow chart illustrating a decomposition and encoding process which may advantageously be employed in a processor or the like to realize progressive decomposition and encoder 102 of FIG. 1. Accordingly, the process of decomposing an original high resolution image into a basic lower resolution replica and the plurality of supplemental information fields in entered via start step 701. Thereafter, operational block 702 causes the number of columns M, lines N and the number of intermediate lower resolution replicas R to be generated to be obtained. Then, operational block 703 causes the initialization of the decomposition process by setting $i=m=r=0$, $k=n=1$, $s(0,j,1)=$"0" for $0 \leq j \leq M/2$, and $s(1,0,1)=$"0", where "O" represents a white tone and is a logical 0. Conversely, "1" represents a black tone and is a logical 1. Operational block 704 obtains from image source 101 the nth and $(n+1)$th pixels from the kth and $(k+1)$th lines of the original high resolution image, namely, $s(k,n,r)$, $s(k,n+1,r)$, $s(k+1,n,r)$ and $s(k+1,n+1,r)$. This represents a super pixel $(a=b=2)$ in the higher resolution image which is to be decomposed into a single lower resolution pixel in a lower resolution replica plus any supplemental information that is required. Operational block 705 sets index j in the lower resolution replica to $j=(n-1)/2$. Conditional branch point 706 tests to determine whether the current lower resolution pixel is located on an "edge" in the lower resolution replica. The current lower resolution pixel is defined as $s(i+1,j+1,r+1)$. The test of step 706 is effected by comparing the previous lower resolution pixel $s(i+1,j,r+1)$ on the same line as the current lower resolution pixel to the pixel above the current lower resolution pixel on the previous line, namely, $s(i,j+1,r+1)$. Thus, if $s(i+1,j,r+1)=s(i,j+1,r+1)$ the test result is NO and control is transferred to conditional branch point 707 where further testing is done to determine whether or not supplemental information must be generated for the current lower resolution pixel. If the test result in step 706 is YES, $s(i+1,j,r+1) \neq s(i,j+1,r+1)$ and supplemental information needs to be generated for the current lower resolution pixel. Accordingly, operational block 708 generates supplemental information $D(m,r+1)$ for the current lower resolution pixel, compresses it, i.e., encodes it to obtain $d(m,r+1)$ and stores the encoded supplemental information for future use. Since in this example, the super pixel includes four two-tone high resolution pixels, there are sixteen possible combinations. Supplemental information $D(m,r+1)$ determines which one of the sixteen possible combinations is the current super pixel. Thus, step 708 generates $D(m,r+1)=s(k,n,r+1)$, $s(k,n+1,r+1)$, $s(k+1,n,r+1)$ and $s(k+1,n+1,r+1)$, which yields a binary number depending on the tones included in the plurality of high resolution pixels of the current super pixel. By way of an example, if $s(k,n,r+1)$ is white, $s(k,n+1,r+1)$ is black, $s(k+1,n,r+1)$ is white and $s(k+1,n+1,r+1)$ is black and, since white is a logical 0 and black is a logical 1, $D(m,r+1)=0101$ (binary). The compressing and encoding of the supplemental information $D(m,r+1)$ is realized by utilizing an arithmetric encoder. One such encoder is described in the article entitled "Compression of Black-White Images with Arithmetic Coding", cited above. Operational block 709 increments the supplemental information counter, $m=m+1$. Operational block 710 chooses the tone of the current lower resolution pixel, $s(i+1,j+1,r+1)$ and stores it for future use. A particular subprocess (SUB A) for selecting the tone of the current lower resolution pixel is shown in FIG. 6 and was described above. Control is transferred to operational block 711.

Let us now return to step 707. Step 707 effectively determines if the tone of the previous lower resolution pixel on the same line as the current lower resolution pixel is the same as all the tones of the high resolution pixels in the current super pixel. If the tones of the high resolution pixels of the current super pixel corresponding to the current lower resolution pixel are all the same as the tone of the previous lower resolution pixel on the same line as the current lower resolution pixel, the test result of step 707 is YES and there is no need to generate supplemental information for the current lower resolution pixel. Thereafter, operational block 712 sets the tone of the current lower resolution pixel to be the same as the tone of the previous lower resolution pixel on the same line as the current lower resolution pixel, i.e., $s(i+1,j+1,r+1)=s(i+1,j,r+1)$ and stores it for future use. If the test result in step 707 is NO, supplemental information is required to be generated for the current lower resolution pixel. Therefore, operational block 713 generates supplemental information $D(m,r+1)$, compresses and encodes it to obtain $d(m,r+1)$ and stores $d(m,r+1)$ for the current lower resolution pixel in the same manner as step 708 described above. Thereafter, operational block 714 causes the supplemental information counter to be incremented, $m=m+1$. Operational block 715 causes the tone of the current lower resolution pixel to be opposite the tone of the previous lower resolution pixel on the same line as the current lower resolution pixel.

In summary, steps 704 through 710 and 712 through 715 are employed to decompose a super pixle in a high resolution image including a plurality of high resolution pixels, in this example, 4 high resolution pixels, arranged in a so-called 2-by-2 configuration (FIG. 3), into a single lower resolution pixel in the lower resolution replica plus supplemental information, if any is required.

Operational block 711 increments the column counter for the high resolution image by 2, namely, $n=n+2$, to go on to the next super pixel. Conditional branch point 716 tests to determine if the last column in a line (end of line) has been reached, namely, $n \geq M$. If the test result is NO, the last column has not been reached and control is returned to operational block 704 and steps 704 through 710 and 712 through 715 are iterated for the next super pixel in the high resolution image. If the test result in step 716 is YES, the last column has been reached and operational block 717 increments the line counter by 2, namely, setting $k=k+2$. Conditional branch point 718 tests to determine if the end of image has been reached, namely, if $k \geq N$. If the test results is YES, control is transferred to operational block 719. If the test result in step 718 is NO, operational block 720 sets the higher resolution column counter to $n=1$, and the lower resolution line counter $i=(k-1)/2$. Thereafter, operational block 721 initializes the pixel in the lower resolution replica to a white tone, namely, $s(i,0r+1)=$"0". Thereafter, control is returned to operational block 704 and steps 704 through 718, 720 and 721 are iterated until the particular lower resolution replica is completed and step 718 yields a YES result.

Then, operational block 719 causes the current number of columns M to be set to M/2 and the current number of lines to be set to N/2, sets i=m=0, k=n=1 and r=r+1. This initializes the processes to decompose the current intermediate lower resolution replica into the next intermediate lower resolution replica. These initialized M and N parameters are supplied to operational block 724. Conditional branch point 722 tests to determine if r=R, i.e., whether the basic lower resolution replica has been generated. If the test result is YES, control is transferred to operational block 724. If the test result in step 722 is NO, the basic lower resolution replica has not been generated and operational block 723 sets lower resolution pixel $s(0,j,r+1)=$"0" for $0 \leq j \leq M/2$. Thereafter, control is returned to step 704 and steps 704 through 723 are iterated until step 722 yields a YES result. This indicates that the basic lower resolution replica has been generated. Then, operational block 724 compresses, i.e., encodes the basic lower resolution pixels $s(i,j,R)$ and supplies the compressed version for $1 \leq i \leq M$ and $1 \leq j \leq M$ to transmitter 103 for transmission to a remote location. The compression, i.e., encoding, is realized by employing any one of several known CCITT or other standard techniques. Preferably, the encoding technique used is the one described in the article entitled "Facsimile Coding Schemes and Coding Control Functions for Group IV Facsimile Apparatus", cited above. Operational block 725 causes the stored encoded supplemental information $d(m,r)$ to be outputted to transmitter 103 for all "m" and in the sequence $r=R, R-1, R-2, \ldots, 1$. Thereafter, the process is ended via stop step 726.

Returning to FIG. 1, transmitter 103 may be any of several alternatives, also depending on the application of the decomposition process of this invention. Transmitter 103 supplies the information to be transmitted to 048704977 transmission network 104. Transmission network 104 may be, for example, an integrated services digital network (ISDN) or any other desired network. The transmitted information is supplied to receiver 105 in a remote location. Receiver 105 is compatible with transmitter 103. Receiver 105 supplies the receiver encoded basic low resolution replica pixel information and the received supplemental information in fields $d(m,R)$ to decoder and progressive synthesizer 106.

Decoder and progressive synthesizer 106 is compatible with progressive decomposition processor and encoder 102. It includes the functional elements shown in dashed outline, namely, basic lower resolution replica decoder 111, supplemental information decoder 112 and progressive synthesizer 113. Basic lower resolution replica decoder 111 decodes the basic lower resolution replica pixel information from receiver 105 to generate the basic lower resolution pixels $s(i,j,R)$ which are supplied to progressive synthesizer 113. Again, decoder 111 is compatible with encoder 109 and is preferably the one described in the article entitled "Facsimile Coding Schemes and Coding Control Functions for Group IV Facsimile Apparatus", cited above. Similarly, supplemental information decoder 112 decodes the encoded supplemental information fields $d(m,R)$ supplied from receiver 105 to generate the supplemental information fields $D(m,R)$ which are also supplied to progressive synthesizer 113. Here again, decoder 112 is compatible with encoder 110 and is of a type described in the article entitled "Compression of Black-White Images with Arithmetic Coding", cited above. Progressive synthesizer 113 reverses the decomposition process and synthesizes the high resolution image, in accordance with an aspect of the invention, from the basic lower resolution pixels and the plurality of supplemental information fields. The recomposed original high resolution pixels $s(k,n,0)$ are supplied to high resolution document monitor 107 where they are used as desired.

The successive recomposition process is the inverse of the decomposition process that is graphically illustrated in FIG. 2. Thus, starting with the basic lower resolution replica having $M_3$ columns and $N_3$ lines and its supplemental information $D(m,3)$, a next higher resolution intermediate replica is generated having $M_2$ columns and $N_2$ lines. Then, using this intermediate replica and its supplemental information $D(m,2)$, the next higher resolution intermediate replica is generated having $M_1$ columns and $N_1$ lines. And, finally, using this higher resolution intermediate replica and its supplemental information $D(m,1)$, the original higher resolution image having $M_0$ columns and $N_0$ lines is generated.

Figure 9:
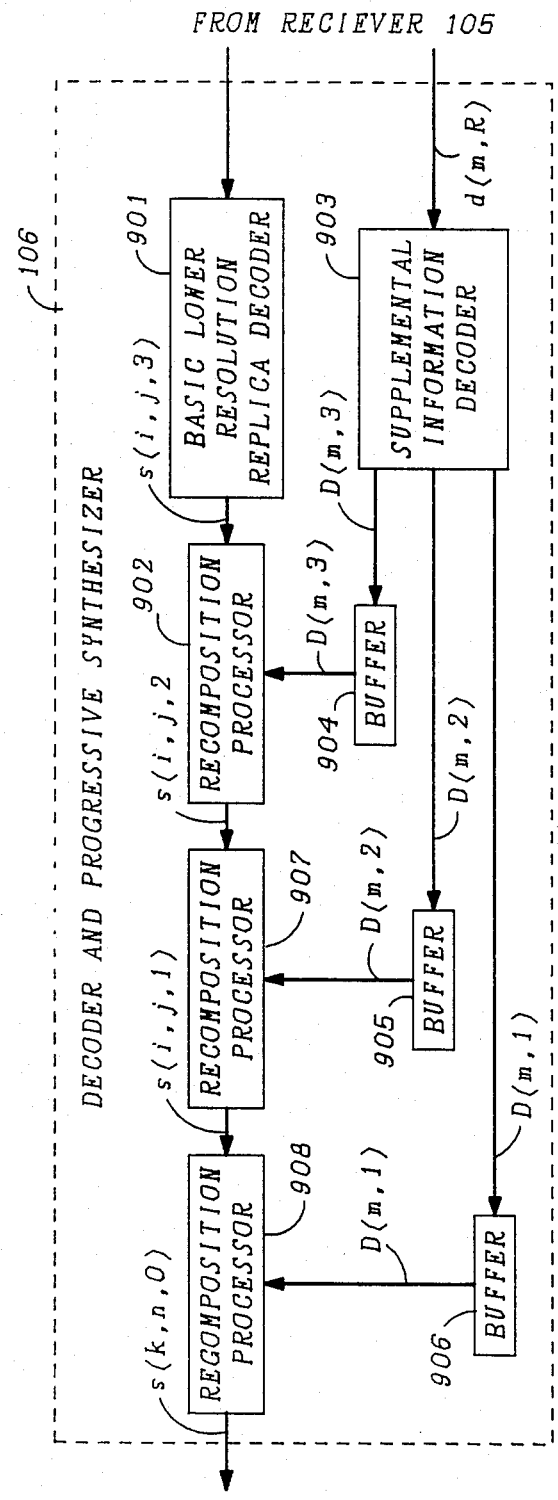
FIG. 9 depicts in simplified block form, details of one implementation of decoder and progressive synthesizer processor 106 of FIG. 1.

FIG. 9 shows in simplified block diagram form details of one implementation of decoder and progressive synthesizer 106 of FIG. 1. Although any desired number of intermediate recompositions may be employed, a number compatible with progressive decomposition processor and encoder 102 is employed in this example. It should be noted, however, that the recomposition process need not progress to yield the original high resolution image and may be stopped at any desired resolution level. Accordingly, shown is basic lower resolution replica decoder 901 which decodes the basic lower resolution replica pixel information from receiver 105 (FIG. 1) to yield the basic lower resolution replica pixels $s(i,j,3)$. Decoder 901 is preferably the one described in the article entitled "Facsimile Coding Schemes and Coding Control Functions for Group IV Facsimile Apparatus", cited above. The basic lower resolution replica pixels $s(i,j,3)$ are supplied to recomposition processor 902. Supplemental information decoder 903 decodes the received encoded supplemental information $d(m,3)$, $d(m,2)$ and $d(m,1)$ fields and supplies the decoded supplemental information $D(m,3)$, $D(m,2)$ and $D(m,1)$ fields to buffer storage units 904, 905 and 906, respectively. Supplemental information decoder 903 is preferably the one disclosed in the article intitled "Compression of Black-White Images with Arithmetic Coding", cited above.

Figure 10:
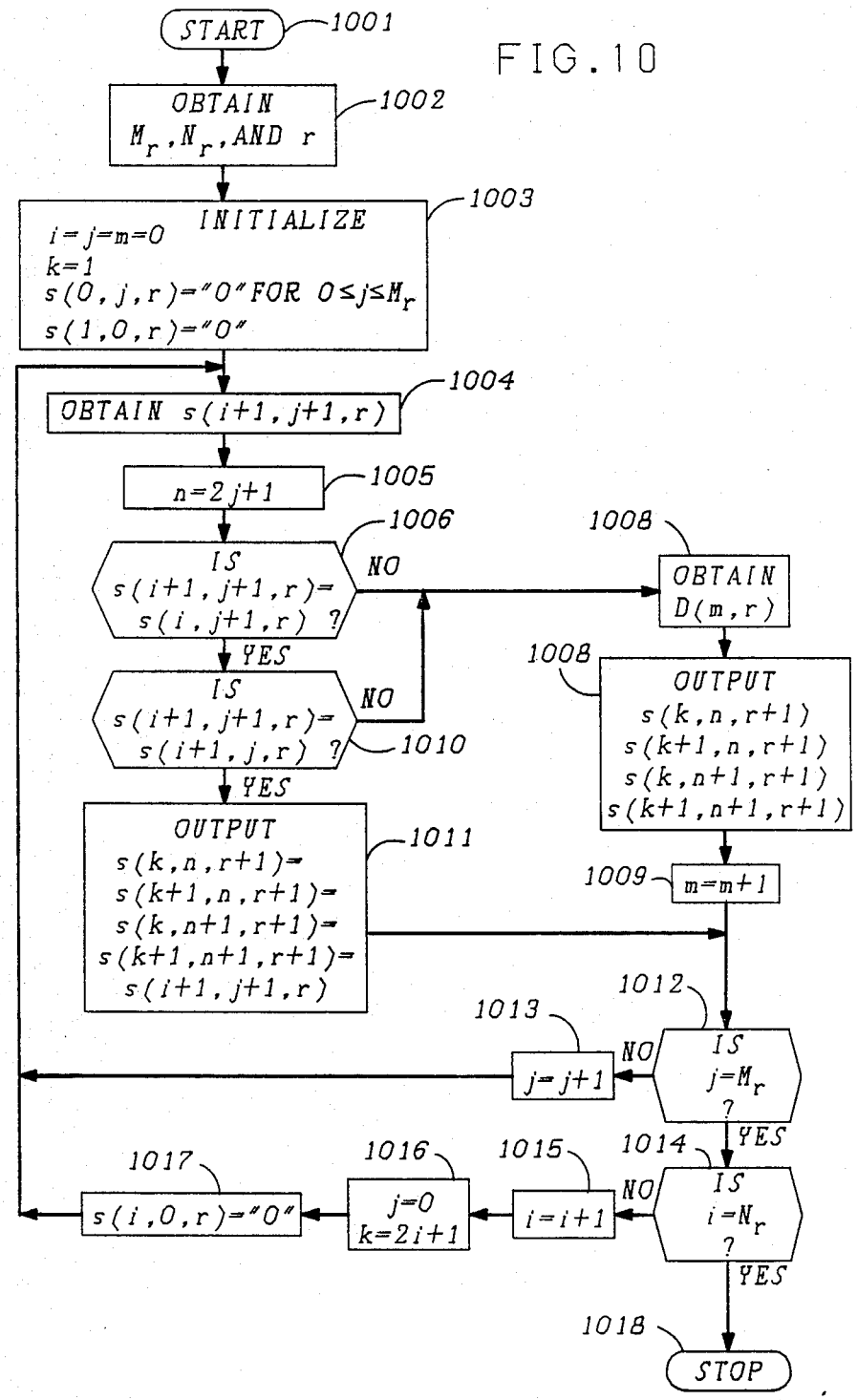
FIG. 10 shows a flow chart of a synthesizer process imployed in the decoder and progressive synthesizer processor implementation of FIG. 9.

Thus, recomposition processor 902 is supplied with the basic lower resolution replica pixel information $s(i,j,3)$, in this example, from decoder 901 and the corresponding supplemental information $D(m,3)$ from buffer storage unit 904. Processor 902 operates on the lower resolution pixels $s(i,j,3)$ and the supplemental information $D(m,3)$, if any, to reconstruct higher resolution intermediate replica pixels $s(i,j,2)$. The recomposition process of recomposition processor 902 is described hereinafter in relationship to the flow chart of FIG. 10. Consequently, recomposition processor 902 generates intermediate replica pixels $s(i,j,2)$ which are supplied to recomposition processor 907. Also supplied to processor 907 is supplemental information field $D(m,2)$ from buffer storage unit 905. Processor 907 is identical to processor 902 and operates in identical fashion on the lower resolution intermediate replica pixels $s(i,j,2)$ and the supplemental information $D(m,2)$, if any, to generate intermediate replica pixels $s(i,j,1)$. The intermediate replica pixels $s(i,j,1)$ are supplied to recomposition processor 908 along with the corresponding supplemental information $D(d,1)$ from buffer storage unit 906. Again, processor 908 is identical in structure and operation to processor 902. It operates on the intermediate pixels s(i,j,1) and supplemental information D(m,1) to generate the high resolution pixels s(k,n,0) of the original image.

The operation of each of recomposition processors 902, 907 and 908 is identical. Consequently, the operation of recomposition processors 902, 907 and 908 will be described in generalized form with reference to recomposition processor 902. Operation of the recomposition process used in recomposition processor 902 in synthesizing a higher intermediate resolution replica is shown in the flow chart of FIG. 10. Accordingly, the process is entered via start step 1001. Thereafter, operational block 1002 obtains the number $M_r$ of the columns in the original high resolution image, the number $N_r$ of the lines in the high resolution image and the value of r. This information is obtained for processor 902 from receiver 105 from overhead bits or the like in the transmitted signal in well-known fashion and the value of r for r<R is obtained from the previous one of recomposition processors 902 and 907, in this example. Operational block 1003 initializes the processor parameters. Specifically, i=j=m=0, k=1, s(0,j,r)="0" for $0 \leq j \leq M_r$ and s(1,0,r)="0". Operational block 1004 causes a current lower resolution pixel s(i+1,j+1,r) to be read from decoder 901 for processor 902. For processors 907 and 908 the current lower resolution pixel is read from the previous recomposition processor. Thus, for processor 907, it is read from processor 902 and for processor 908, it is read from processor 907. Operational block 1005 causes the next higher resolution replica column counter to be set to a specific value, namely, n=2j+1. Conditional branch point 1006 tests to determine whether the tone of the current lower resolution pixel is equal to the tone of the lower resolution pixel above it in a previous line, namely, whether s(i+1,j+1,r)=s(i+1,j,r). If the test result in step 1006 is NO, then the current lower resolution pixel is defined to be at an "edge" in the current lower resolution replica and operational block 1007 causes the supplemental information D(m,r) to be read from the corresponding buffer. For recomposition processor 902, supplemental information D(m,3) is read from buffer 904. As indicated above, d(m,3) represents one of the sixteen possible combinations for the current super pixel in the next higher resolution replica which is to replace the current lower resolution pixel. Accordingly, operational block 1008 causes the tones of the higher resolution pixels in the current super pixel to be generated, namely, the tones of s(k,n,r−1), s(k+1,n,r−1), s(k,n+1,r−1) and s(k+1,n+1,r−1). Operational block 1009 causes the supplemental information counter to be incremented by 1, namely, setting m=M+1 and control is transferred to conditional branch point 1012. Returning to step 1006, if the test result is YES, conditional branch point 1010 tests to determine whether the current lower resolution pixel has the same tone as the previous lower resolution pixel on the same line, namely, whether s(i+1,j+1,r)=s(i+1,j,r). if the test result is NO, the current lower resolution pixel is at an edge in the current low resolution replica and the supplemental information for substituting the high resolution pixels for the lower resolution pixel is obtained via steps 1007 and 1008 and steps 1009 and 1012 are repeated, as described above. If the test result in step 1010 is YES, the current lower resolution pixel is not at an edge in the current lower resolution replica and, therefore, no supplemental information is available. Operational block 1011 causes the tones of the four higher resolution pixels in the higher resolution super pixel substituted for the current lower resolution pixel to be that of the current lower resolution pixel, namely, s(k,n+1,r−1)=s(k+1,n,r−1)=s(k,n+1,r−1)=s(k+1,n+1,r−1)=s(i+1,+1,r). Conditional branch point 1012 tests to determine if the current lower resolution pixel is in the last column of the current lower resolution replica (end of line). If the test result in step 1012 is NO, operational block 1013 causes the column counter for the current lower resolution replica to be incremented by 1 by setting j=j+1. Thereafter, control is returned to operational block 1004 and steps 1004 through 1013 are iterated until an end of line is reached and the test in step 1012 yields a YES result. Then, conditional branch point 1014 tests to determine whether the process is at the end of the replica. If the test result in step 1014 is YES, the process is stopped via stop step 1018. If the test result in step 1014 in NO, operational block 1015 causes the current lower resolution replica line counter to be incremented by 1 by setting i=i+1. Then, operational block 1016 causes the current lower resolution replica column counter to be set to i=0 and the higher resolution replica line counter to be set to k=2i+1. Operational block 1017 reinitializes the lower resolution pixel, namely, by setting s(i,0,r)="0". Thereafter, control is again returned to operational block 1004 and steps 1004 through 1017 are iterated until step 1014 yields a YES result and we are at the end of the replica. Then, the process is stopped by step 1018.

Each of recomposition processors 902, 907 and 908 can also be implemented in software for use in a processor, e.g., a digital signal processor, or on a VLSI chip or the like, as desired. Indeed, it is envisioned that decoder and progressive synthesizer 106 will be implemented on a VLSI chip.

The recomposed high resolution pixels s(k,n,0) are supplied from decoder and progressive synthesizer 106 to high resolution document monitor 107 for use as desired.

Figure 11:
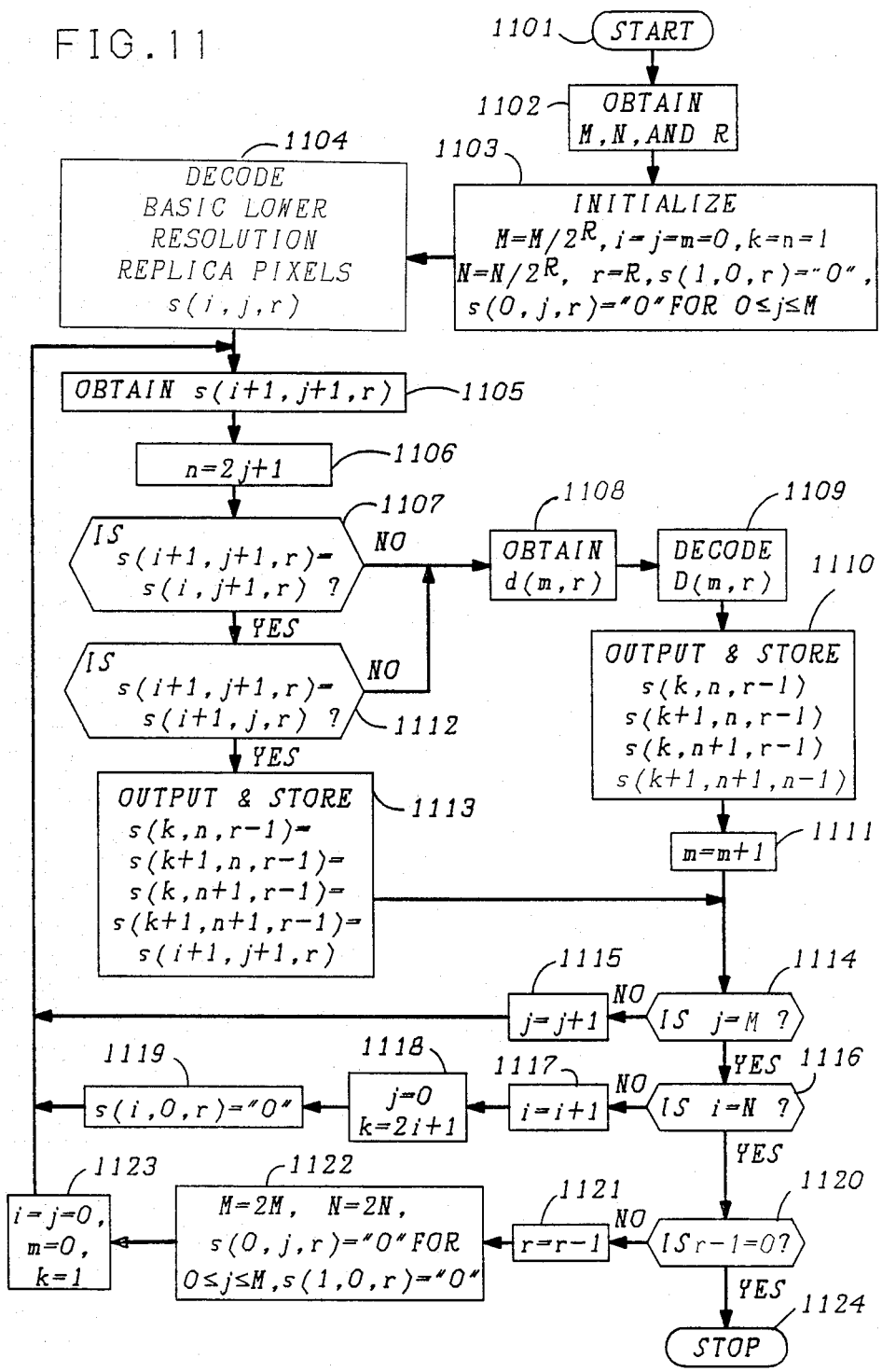
FIG. 11 shows a flow chart of a software implementation of decoder and progressive synthesizer processor 106 of FIG. 1.

FIG. 11 is a flow chart illustrating a decoding and recomposition process which may be advantageously employed in a processor or the like to realize decoder and progressive synthesizer 106 of FIG. 1. Accordingly, the process of recomposing an image through successively upgrading from a basic lower resolution replica and a plurality of supplemental information fields is entered via start step 1101. Thereafter, operational block 1102 obtains the number M of the columns in the original high resolution image, the number N of lines in the original high resolution image and the value of R. In this example, R=3. This information is obtained from receiver 105 from overhead bits or the like in the transmitted signal in well-known fashion. Operational block 1103 initializes processor parameters. Specifically, i=j=m=0, k=n=1, $M=M/2^R$, $N=N/2^R$, r=R, s(0,j,r)="0" for $0 \leq j \leq M$ and s(1,0,r)="0". Operational block 1104 causes the basic lower resolution pixels to be decoded to generate s(i+1,j+1,r) pixels. For the first pass, in this example r=R=3. The decoder function is preferably the one described in the article entitled "Facsimile Coding Schemes and Coding Control Functions for Group IV Facsimile Apparatus", cited above.

Operational block 1105 causes a current lower resolution pixel s(i+1,j+1,r) to be obtained. Operational block 1106 causes the next higher resolution replica column counter to be set to a specific value, namely, $n=2j+1$. Conditional branch point 1107 tests to determine whether the tone of the current lower resolution pixel is equal to the tone of the lower resolution pixel above it in a previous line, namely, whether $s(i+1,j+1,r)=s(i,j+1,r)$. If the test result in step 1107 is NO, the current lower resolution pixel is defined to be an "edge" in the current lower resolution replica and operational block 1108 causes the corresponding encoded supplemental information $d(m,r)$ to be obtained. Thereafter, operational block 1109 causes decoding of the supplemental information to obtain $D(m,r)$. Again, the decoding algorithm employed is preferably the one described in the article entitled "Compression of Black-White Images with Arithmetic Coding", cited above. As indicated above, $D(m,r)$, in this example, represents one of sixteen possible combinations for the current super pixel of the next higher resolution replica which is to replace the current lower resolution pixel. Accordingly, operational block 1110 causes the tones of the higher resolution pixels in the current super pixel to be generated, namely, the tones of $s(k,n,r-1)$, $s(k+1,n,r-1)$, $s(k,n+1,r-1)$ and $s(k+1,n+1,r-1)$. Operational block 1111 causes the supplemental information counter to be incremented $m=m+1$ and, then, control is transferred to conditional branch point 1114. Returning to step 1107, if the test result is YES, conditional branch point 1112 tests to determine whether the current lower resolution pixel has the same tone as the previous lower resolution pixel on the same line, namely, whether $s(i+1,j+1,r)=s(i+1,j,r)$. If the test results in NO, the current lower resolution pixel is at an edge in the current lower resolution replica and the supplemental information for substituting the high resolution pixels for the lower resolution pixel is obtained via steps 1108, 1109 and 1110. If the test result in step 1112 is YES, the current lower resolution pixel is not at an edge in the current lower resolution replica and, therefore, no supplemental information is available. Operational block 1113 causes the tones of the four high resolution pixels in the super pixel to be substituted for the current lower resolution pixel to be that of the current lower resolution pixel, namely, $s(k,n,r-1)=s(k+1,n,r-1)=s(k,n+1,r-1)=s(k+1,n+1,r-1)=s(i+1,j+1,r)$. Conditional branch point 1114 tests to determine if the current lower resolution pixel is in the last column of the current lower resolution replica (end of line). If the test result in step 1114 is NO, operational block 1115 causes the column counter for the current lower resolution replica to be incremented by 1 by setting $j=j+1$. Thereafter, control is returned to operational block 1105 and steps 1105 through 1115 are iterated until an end of line is reached and the test in step 1114 yields a YES result. Thereafter, conditional branch point 1116 tests to determine whether the process is at the end of the current replica. If the test result in step 1116 is YES, control is transferred to conditional branch point 1120. If the test result in step 1116 is NO, operational block 1117 causes the current lower resolution replica line counter to be incremented by 1 by setting $i=i+1$. Then, operational block 1118 causes the lower resolution column counter to be set to $i=0$ and the higher resolution line counter to be set to $k=2i+1$. Operational block 1119 reinitializes the lower resolution pixel, namely, by setting $s(i,0,r)=$"0". Thereafter, control is again returned to operational block 1105 and steps 1105 through 1119 are iterated until step 1116 yields a YES result and we are at the end of the current replica. Conditional branch, point 1120 tests to determine whether the original high resolution image has been completed, namely, whether $r-1=0$. If the test result is YES, the original high resolution image has been generated and the process is stopped via stop step 1124. However, if the test result of step 1120 is NO, operational block 1121 causes index $r$ counter to be decremented, namely, $r=r-1$ for generation of the next higher resolution replica for upgrading the received image. Operational block 1122 causes updating of $M=2M$, $N\leq 2N$, $s(0,j,r)=$"0" for $0\leq j\leq M$ and $s(1,0,r)=$"0". Operational block 1123 causes updating of $i=j=m=0$ and $k=1$. Thereafter, control is returned to step 1105 and steps 1105 through 1123 are iterated until step 1120 yields a YES result. This would indicate that all of the intermediate replicas have been generated and the original high resolution image has been generated. Thereafter, the process is stopped via stop step 1124.

The recomposed pixels are supplied from decoder and progressive synthesizer 106 (FIG. 1) to high resolution document monitor 107 for use as desired.

What is claimed is:

1. A method for progressively decomposing a high resolution image for facsimile storage or transmission, comprising the steps of a. obtaining a high resolution super pixel, including a plurality of high resolution pixels, from a high resolution image source;

b. determining whether a lower resolution pixel being generated from said super pixel is at an edge in an intermediate lower resolution replica being generated, if so, generating supplemental information for said lower resolution pixel being generated in accordance with first prescribed criteria dependent on said high resolution pixels in said super pixel and selecting a tone for said lower resolution pixel being generated in accordance with second prescribed criteria, if not, determining whether said lower resolution pixel being generated requires supplemental information and, if so, generating said required supplemental information in accordance with said first prescribed criteria and selecting the tone of said lower resolution pixel being generated so that it is at an edge in said intermediate lower resolution replica and, if not, selecting said tone for said lower resolution pixel being generated in accordance with third prescribed criteria;

c. storing said supplemental information, if any;

d. storing a representation of the tone of said lower resolution pixel being generated for said intermediate lower resolution replica, said stored representation being associated with said intermediate lower resolution replica;

e. obtaining a next super pixel from said image source as in step (a);

f. repeating steps (b) through (e) until a last super pixel is obtained from said image source and the high resolution image is decomposed into said intermediate lower resolution replica and a corresponding supplemental information field, said intermediate lower resolution replica being designated a last previously stored intermediate lower resolution replica;

g. obtaining an intermediate super pixel, including a plurality of intermediate high resolution pixels, from the last previously stored intermediate lower resolution replica;

h. determining whether a lower resolution pixel being generated from said intermediate super pixel is at an edge in a current intermediate lower resolution replica being generated.

if so, generating supplemental information for said lower resolution pixel being generated in accordance with said first prescribed criteria dependent on said intermediate high resolution pixels in said intermediate super pixel and selecting a tone for said lower resolution pixel being generated in accordance with said second prescribed criteria, if not, determining whether said lower resolution pixel being generated requires supplemental information and, if so, generating said required supplemental information in accordance with said first prescribed criteria and selecting the tone of said lower resolution pixel being generated so that it is at an edge in said current intermediate lower resolution replica and, if not, selecting said tone for said lower resolution pixel being generated in accordance with said third prescribed criteria;

i. storing said supplemental information, if any;

j. storing a representation of the tone of said lower resolution pixel being generated for said current intermediate lower resolution replica;

k. obtaining a next intermediate super pixel from said last previously stored intermediate lower resolution replica as in step (g);

l. repeating steps (h) through (k) until a last intermediate super pixel is obtained and the last previously stored intermediate lower resolution replica is decomposed into said current intermediate lower resolution replica and corresponding supplemental information, said current intermediate lower resolution replica being designated a last previously stored intermediate lower resolution replica;

m. repeating steps (g) through (l) until a selected number of intermediate lower resolution replicas and a corresponding number of supplemental information fields have been generated, wherein a last one of said selected number of intermediate lower resolution replicas is designated a basic lower resolution replica and includes a pllurality of stored pixel tone representations;

n. outputting the stored pixel tone representations for said basic lower resolution replica; and o. outputting all stored supplemental information fields in a predetermined sequential order.

2. The method as defined in claim 1 where said steps (b) and (h) of determining whether said lower resolution pixel being generated is at an edge each includes determining if at least one lower resolution pixel adjacent to said lower resolution pixel being generated has a tone different from that of said lower resolution pixel being generated.

3. The method as defined in claim 1 wherein said steps (b) and (h) of determining each includes a first step of comparing predetermined other lower resolution pixels adjacent to said lower resolution pixel being generated to each other to determine if said lower resolution pixel being generated is at an edge in the intermediate lower resolution replica being generated, and if said first step of comparing yields a first predetermined result, determining that said lower resolution pixel being generated is at an edge, and wherein said second prescribed criteria includes selecting the tone of said lower resolution pixel being generated in accordance with a predetermined relationship among the tones of the high resolution pixels in said super pixel.

4. The method as defined in claim 3 wherein said lower resolution pixel being generated is located in a predetermined row and a predetermined column of said intermediate lower resolution replica and wherein said other adjacent lower resolution pixels include a first lower resolution pixel adjacent and prior in said row to said lower resolution pixel being generated and a second lower resolution pixel adjacent and prior in said column to said lower resolution pixel being generated.

5. The method as defined in claim 4 wherein a white tone is defined by a first predetermined logical number and a black tone is defined by a second predetermined logical number, and wherein said predetermined relationship is measured by numerically summing logical numbers representing the tones of said high resolution pixels in said super pixel and comparing a numerical sum of said logical numbers to a predetermined value, and if the numerical sum of said logical numbers is greater than said predetermined value, the tone of said lower resolution pixel being generated is selected to be a predetermined one of said white and black tones, and if the numerical sum of said logical numbers is less than said predetermined value, the tone of said lower resolution pixel being generated is selected to be another one of said white and black tones, and if the numerical sum of said logical numbers is equal to said predetermined value, tones of first predetermined ones of said higher resolution pixels in said super pixel are compared to each other, and if they are the same as each other, the tone of said lower resolution pixel being generated is selected to be the same as that of a first predetermined one of said other lower resolution pixels adjacent to said lower resolution pixel being generated, and if the tones of said first predetermined ones of said high resolution pixels are not the same as each other, tones of second predetermined ones of said high resolution pixels in said super pixel are compared to each other, and if they are the same as each other, the tone of said lower resolution pixel being generated is selected to be the same as that of a second predetermined one of said other lower resolution pixels adjacent to said lower resolution pixel being generated, and if the tones of the second predetermined ones of said high resolution pixels are not the same as each other, the tone of said lower resolution pixel being generated is selected to be white.

6. The method as defined in claim 3 wherein if said first step of comparing yields a second predetermined result, said steps of determining each further includes a second step of comparing the tone of a predetermined one of said other lower resolution pixels adjacent to said lower resolution pixel being generated to the tone of each of said high resolution pixels in said super pixel, and if they are all the same as each other, determining that said lower resolution pixel is not at an edge and said third prescribed criteria includes selecting the tone of said lower resolution pixel being generated to be the same as that of said predetermined one of said other lower resolution pixels adjacent to said lower resolution pixel being generated, and if said second step of comparing indicates that said predetermined one of said other lower resolution pixels adjacent to said lower resolution pixel being generated is different from the tone of any of said high resolution pixels in said super pixel, said lower resolution pixel being generated must be forced to be at an edge and said second prescribed criteria includes selecting the tone of said lower resolution pixel being generated to be opposite that of said predetermined one of said other lower resolution pixels adjacent to said lower resolution pixel being generated.

7. The method as defined in claim 3 wherein said first prescribed criteria includes generating said supplemental information to include a representation of the tone of each of said plurality of high resolution pixels in said super pixel.

8. A method for progressively recomposing an image from a received basic low resolution replica and received supplemental information, comprising the steps of:

a. obtaining a low resolution pixel from the received basic low resolution replica;

b. determining whether said obtained low resolution pixel is at an edge in the low resolution replica, if so, obtaining received supplemental information corresponding to said obtained low resolution pixel and substituting said corresponding supplemental information for said obtained low resolution pixel to generate a higher resolution super pixel in an intermediate higher resolution replica being recomposed, said higher resolution super pixel including a plurality of higher resolution pixels having tones determined in accordance with said corresponding supplemental information, if not, generating a higher resolution super pixel including a plurality of higher resolution pixels each having a tone the same as that of said obtained low resolution pixel;

c. storing said higher resolution pixels of said super pixel, said stored higher resolution pixels being associated with said intermediate higher resolution replica being recomposed;

d. obtaining a next low resolution pixel from the received basic low resolution replica an in step (a);

e. repeating steps (b) through (d) until a last low resolution pixel is obtained and said intermediate higher resolution replica is recomposed and stored, said stored intermediate higher resolution replica being designated a last previously stored intermediate low resolution replica;

f. obtaining a stored intermediate low resolution pixel from said last previously stored intermediate low resolution replica;

g. determining whether said obtained intermediate low resolution pixel is at an edge in the last previously stored intermediate low resolution replica, if so, obtaining received supplemental information corresponding to said obtained intermediate low resolution pixel and substituting said corresponding supplemental information for said obtained intermediate low resolution pixel to generate a higher resolution super pixel in a current intermediate higher resolution replica being recomposed including a plurality of intermediate higher resolution pixels having tones determined in accordance with said corresponding supplemental information, if not, generating an intermediate higher resolution super pixel in said current intermediate higher resolution replica being recomposed including a plurality of intermediate higher resolution pixels each having a tone the same as that of said obtained intermediate low resolution pixel;

h. storing said intermediate higher resolution pixels of said super pixel, said stored intermediate higher resolution pixels being associated with said current intermediate higher resolution replica being recomposed;

i. obtaining a next stored intermediate low resolution pixel from said last previously stored intermediate low resolution replica as in step (f);

j. repeating steps (g) through (i) until a last stored intermediate low resolution pixel is obtained and said current intermediate higher resolution replica is recomposed and stored, said stored current intermediate higher resolution replica being designated a last previously stored intermediate low resolution replica.

9. The method as defined in claim 8 wherein steps (f) through (j) are repeated until an original high resolution image having high resolution pixels is recomposed; and further including the step of outputting the high resolution pixels to a document monitor.

10. The method as defined in claim 8 wherein said steps (b) and (g) of determining each includes a first step of comparing said obtained low resolution pixel to a predetermined number of low resolution pixels adjacent to said obtained low resolution pixel, and if said first step of comparing yields a first predetermined result, determining that said low resolution pixel is at an edge, and if said first step of comparing yields a second predetermined result, determining that said low resolution pixel is not at an edge.

11. The method as defined in claim 10 wherein said obtained low resolution pixel is located in a predetermined row and a predetermined column of the low resolution replica and wherein the number of said adjacent low resolution pixels is two and a first one of said predetermined low resolution pixels adjacent to said obtained low resolution pixel is a low resolution pixel adjacent to and prior in said row to said obtained low resolution pixel and wherein a second one of said predetermined low resolution pixels adjacent to said obtained low resolution pixel is a low resolution pixel adjacent and prior in said column to said low resolution pixel.

12. Apparatus for progressively decomposing a high resolution image for facsimile storage or transmission comprising:

a source of a high resolution image having a plurality of high resolution pixels;

a plurality of decomposition processor means for decomposing super pixels of high resolution pixels into corresponding lower resolution pixels and supplemental information, said plurality of decomposition means being connected in succession to make successive decompositions of said high resolution image, a first of said plurality of decomposition processor means in said succession being adapted to obtain high resolution pixels from said image source, each of said plurality of decomposition processor means including means for obtaining higher resolution super pixels in a predetermined sequence, each of said higher resolution super pixels including a plurality of high resolution pixels, means for generating lower resolution pixels to be substituted for corresponding ones of said higher resolution super pixels, means for determining whether each of said lower resolution pixels being generated is at an edge in a lower resolution replica being generated, means for generating supplemental information in accordance with first prescribed criteria for each lower resolution pixel being generated determined to be at an edge;

said means for generating said lower resolution pixels including first means for generating a tone in accordance with second prescribed criteria for each of said lower resolution pixels determined to be at an edge, means for determining whether supplemental information is required for each of said lower resolution pixels being generated, means for generating supplemental information in accordance with said first prescribed criteria for said lower resolution pixels determined to require it, means for generating a tone for each of said lower resolution pixels in accordance with third prescribed criteria determined not to be at an edge, means for outputting a representation of the tone of each lower resolution pixel, and means for outputting said supplemental information, if any; and means for outputting supplemental information fields from each of said plurality of decomposition processor means in predetermined sequential order, wherein the tone representations of the lower resolution pixels from a final decomposition processor means in said succession are designated basic lower resolution replica pixel information.

13. The apparatus as defined in claim 12 wherein said means for determining whether said lower resolution pixels being generated are at edges includes a means for determining, for each low resolution pixel being generated, if at least one lower resolution pixel adjacent to said lower resolution pixel being generated has a tone different from that of said lower resolution pixel being generated.

14. The apparatus as defined in claim 12 wherein said means for determining whether said lower resolution pixels being generated are at edges includes a first means for comparing predetermined other lower resolution pixels adjacent to said lower resolution pixel being generated to determine if said lower resolution pixel being generated is at an edge, and if said first means for comparing generates a first predetermined result, determining that said lower resolution pixel being generated is at an edge, and wherein said first means for generating a tone includes means for selecting the tone of said lower resolution pixel in accordance with said second prescribed criteria, said second prescribed criteria being based on a predetermined relationship of the tones of said higher resolution pixels in a super pixel corresponding to said lower resolution pixel to each other.

15. The apparatus as defined in claim 14 wherein said lower resolution pixel being generated is located in a predetermined row and a predetermined column of the lower resolution replica and wherein said other lower resolution pixels adjacent to said lower resolution pixel being generated include a first lower resolution pixel adjacent and prior in said predetermined row to said lower resolution pixel and a second lower resolution pixel adjacent and prior in said predetermined column to said lower resolution pixel being generated.

16. The apparatus as defined in claim 15 wherein a white tone is defined by a first predetermined logical number and a black tone is defined by a second predetermined logical number, and wherein said predetermined relationship is measured by numerically summing logical numbers representing the tones of said high resolution pixels in said super pixel and comparing a numerical sum of said logical numbers to a predetermined value, and if the numerical sum of said logical numbers is greater than said predetermined value, the tone of said lower resolution pixel being generated is selected to be a predetermined one of said white and black tones, and if the numerical sum of said logical numbers is less than said predetermined value, the tone of said lower resolution pixel being generated is selected to be the other one of said white and black tones, and if the numerical sum of said logical numbers is equal to said predetermined value, the tones of first predetermined ones of said higher resolution pixels in said super pixel are compared to each other and if they are the same as each other, the tone of said lower resolution pixel being generated is selected to be the same as that of a first predetermined one of said other lower resolution pixels adjacent to said lower resolution pixel being generated, and if the tones of said first predetermined ones of said higher resolution pixels are not the same as each other, the tones of second predetermined ones of said higher resolution pixels in said super pixel are compared to each other, and if they are the same as each other, the tone of said lower resolution pixel is selected to be the same as that of a second predetermined one of said other lower resolution pixels adjacent to said lower resolution pixel being generated, and if the tones of said second predetermined ones of said higher resolution pixels are not the same as each other, the tone of said lower resolution pixel being generated is selected to be white.

17. The apparatus as defined in claim 14 wherein said means for determining whether said lower resolution pixels being generated are at edges further includes a second means for comparing, responsive to a second predetermined result from said first means for comparing, a predetermined one of said other lower resolution pixels adjacent to said lower resolution pixel being generated to each of said high resolution pixels in said super pixel and if they are all the same as each other, determining that said lower resolution pixel being generated is not at an edge and said third prescribed criteria includes selecting the tone of said lower resolution pixel being generated to be the same as that of said predetermined one of said other lower resolution pixels adjacent to said lower resolution pixel being generated, and if said second means for comparing indicates that said predetermined one of said other lower resolution pixels adjacent to said lower resolution pixel being generated is different from any of said high resolution pixels in said super pixel, said lower resolution pixel being generated must be forced to be at an edge and said second criteria includes selecting the tone of said lower resolution pixel to be opposite that of said predetermined one of said other lower resolution pixels adjacent to said lower resolution pixel being generated.

18. The apparatus as defined in claim 14 wherein said first prescribed criteria includes generating said supplemental information to include a representation of the tone of each of said plurality of high resolution pixels in said super pixel.

19. Apparatus for progressively recomposing a high resolution image from a received basic low resolution replica and received supplemental information comprising:

a plurality of recomposition processor means for recomposing higher resolution replicas from low resolution pixel information and supplemental information, said plurality of recomposition processor means being connected in succession to successively generate higher resolution replicas, a first one of said recomposition processor means in said succession being adapted to obtain basic low resolution pixels from said received basic low resolution replica and corresponding supplemental information, each of said plurality of decomposition processor means including means for obtaining low resolution pixels from a low resolution replica, means for determining whether individual ones of said obtained low resolution pixels are at an edge in said low resolution replica;

means for obtaining corresponding supplemental information for individual ones of said obtained low resolution pixels determined to be at an edge in said low resolution replica and for substituting said corresponding supplemental information for said low resolution pixel determined to be at an edge to generate a higher resolution super pixel in a higher resolution replica being recomposed, each super pixel having a plurality of higher resolution pixels each having a tone determined from said corresponding supplemental information, means for generating a higher resolution super pixel having said plurality of higher resolution pixels for each low resolution pixel not at an edge, each of said higher resolution pixels in said higher resolution super pixel having a tone the same as that of a corresponding low resolution pixel, and means for outputting said higher resolution pixels.

20. The apparatus as defined in claim 19 wherein said means for determining includes a first means for comparing said obtained low resolution pixel to a predetermined number of low resolution pixels adjacent to said obtained low resolution pixel, and if said first means for comparing yields a first predetermined result, determining that said obtained low resolution pixel is at an edge, and if said first means for comparing yields a second predetermined result, determining that said obtained low resolution pixel is not at an edge.

21. The apparatus as defined in claim 20 wherein the number of said low resolution pixels adjacent to said obtained low resolution pixel is two and wherein said obtained low resolution pixel is located in a predetermined row and a predetermined column of the low resolution replica, and wherein a first predetermined low resolution pixel is a low resolution pixel adjacent to and prior in said predetermined row to said obtained low resolution pixel and a second predetermined low resolution pixel is a low resolution pixel adjacent to and prior in said predetermined column to said obtained low resolution pixel.

22. The apparatus as defined in claim 19 further including a document output unit to which the higher resolution pixels outputted from a final recomposition processor means in said succession are supplied.

* * * * *